US011879217B2

(12) United States Patent
Hedstrom et al.

(10) Patent No.: US 11,879,217 B2
(45) Date of Patent: Jan. 23, 2024

(54) RETENTION SYSTEM FOR RETAINING MILLING DRUMS

(71) Applicant: Caterpillar Paving Products Inc., Brooklyn Park, MN (US)

(72) Inventors: Craig Thomas Hedstrom, Mounds View, MN (US); Nicholas Bernard Johnson, Dayton, MN (US); Ryan Steve Hutar, Plymouth, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 294 days.

(21) Appl. No.: 17/495,002

(22) Filed: Oct. 6, 2021

(65) Prior Publication Data

US 2023/0104194 A1    Apr. 6, 2023

(51) Int. Cl.
*E01C 23/088* (2006.01)
*E01C 23/12* (2006.01)

(52) U.S. Cl.
CPC .......... *E01C 23/088* (2013.01); *E01C 23/127* (2013.01)

(58) Field of Classification Search
CPC .............................. E01C 23/088; E01C 23/127
See application file for complete search history.

(56) References Cited

U.S. PATENT DOCUMENTS

| 4,714,294 | A | 12/1987 | Swan | |
| 6,877,818 | B1* | 4/2005 | Gaertner | E01C 23/088 |
| | | | | 404/90 |
| 8,714,660 | B2 | 5/2014 | Rodel et al. | |
| 9,938,827 | B2* | 4/2018 | Beller | E21C 25/08 |
| 10,724,188 | B2 | 7/2020 | Berning et al. | |
| 11,674,273 | B2* | 6/2023 | Hutar | E01C 23/088 |
| | | | | 299/39.4 |
| 2014/0015304 | A1 | 1/2014 | Rodel et al. | |
| 2020/0407927 | A1 | 12/2020 | Berning et al. | |

FOREIGN PATENT DOCUMENTS

| DE | 102017220518 A1 | 11/2018 |
| EP | 2597205 B1 | 4/2014 |
| EP | 3406797 A1 | 11/2018 |
| EP | 3406798 B1 | 11/2019 |

OTHER PUBLICATIONS

Office Action for German Patent Appln. No. 10 2022 125 549.2, (11 pgs).

* cited by examiner

*Primary Examiner* — Janine M Kreck

(57) ABSTRACT

A retention system for retaining a milling drum to a driveshaft of a milling assembly. The driveshaft is powered to drive the milling drum about an axis. The retention system includes a retention member coupled to the driveshaft between a first position and a second position. In the first position, the retention member restricts a disengagement between an engagement surface of the driveshaft and a mating surface of the milling drum, inhibiting a release of the milling drum from the driveshaft along the axis. In the second position, the retention member provides clearance for the disengagement of the engagement surface and the mating surface, facilitating the release of the milling drum from the driveshaft along the axis.

20 Claims, 7 Drawing Sheets

RETENTION SYSTEM FOR RETAINING MILLING DRUMS

TECHNICAL FIELD

The present disclosure relates to milling drums in milling machines. More particularly, the present disclosure relates to a retention system for retaining a milling drum to a driveshaft of a milling machine.

BACKGROUND

Milling machines, such as cold planers (also known as road mills or profilers), are generally used to process (e.g., scarify, remove, reclaim, etc.) material from ground surfaces (e.g., a roadway, parking lots, etc.). A milling machine typically includes a frame and a milling assembly supported by the frame. The milling assembly includes a cutting drum or a milling drum having multiple cutting tools disposed thereon. The milling drum is spun by a suitable mechanism and is then lowered to break up and pulverize one or more layers of materials from the ground surface.

Depending upon a nature of application, differently finished surfaces may need to be attained over a ground surface by way of a milling operation. To meet such differently finished surfaces over a ground surface, it is common for different milling drums (e.g., having varying specifications and/or configurations) to be interchangeably installed or mounted onto the milling machines. However, changing a milling drum is a time and labor intensive task, and, in most cases, a milling machine and/or the site operators suffer significant downtime during a milling drum changeout. This in turn leads to lost man hours and reduced worksite productivity.

U.S. Publication No. 20200407927 relates to an earth working machine having a machine frame and a drive configuration rotationally drivable relative to the machine frame around a drive axis. It further encompasses a working apparatus to which the drive configuration is releasably connected for rotation together. The drive configuration projects from an axial end axially into the working apparatus and the working apparatus is retained on the drive configuration, against axial displacement relative to the drive configuration, by an accessible central bolt arrangement having a bolt axis collinear with the drive axis.

SUMMARY OF THE INVENTION

In one aspect, the disclosure relates to a retention system for retaining a milling drum to a driveshaft of a milling assembly. The driveshaft is configured to be powered to drive the milling drum about an axis. The retention system includes a retention member coupled to the driveshaft between a first position and a second position. In the first position, the retention member restricts a disengagement between an engagement surface of the driveshaft and a mating surface of the milling drum, inhibiting a release of the milling drum from the driveshaft along the axis. In the second position, the retention member provides clearance for the disengagement of the engagement surface and the mating surface, facilitating the release of the milling drum from the driveshaft along the axis.

In another aspect, the disclosure is directed to a milling assembly for a milling machine. The milling assembly includes a milling drum defining a mating surface and a driveshaft configured to be powered to drive the milling drum about an axis. The driveshaft defines an engagement surface to engage with the mating surface. The milling assembly also includes a retention system for retaining the milling drum to the driveshaft. The retention system includes a retention member couplable to the driveshaft between a first position and a second position. In the first position, the retention member restricts a disengagement between the engagement surface and the mating surface, inhibiting a release of the milling drum from the driveshaft along the axis. In the second position, the retention member provides clearance for the disengagement of the engagement surface and the mating surface, facilitating the release of the milling drum from the driveshaft along the axis.

In yet another aspect, the disclosure is related to a milling machine. The milling machine includes a frame and a milling assembly supported by the frame. The milling assembly includes a milling drum, a driveshaft, and a retention system. The milling drum defines a mating surface. The driveshaft is configured to be powered to drive the milling drum about an axis. The driveshaft defines an engagement surface to engage with the mating surface. The retention system retains the milling drum to the driveshaft. The retention system includes a retention member couplable to the driveshaft between a first position and a second position. In the first position, the retention member restricts a disengagement between the engagement surface and the mating surface, inhibiting a release of the milling drum from the driveshaft along the axis. In the second position, the retention member provides clearance for the disengagement of the engagement surface and the mating surface, facilitating the release of the milling drum from the driveshaft along the axis.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
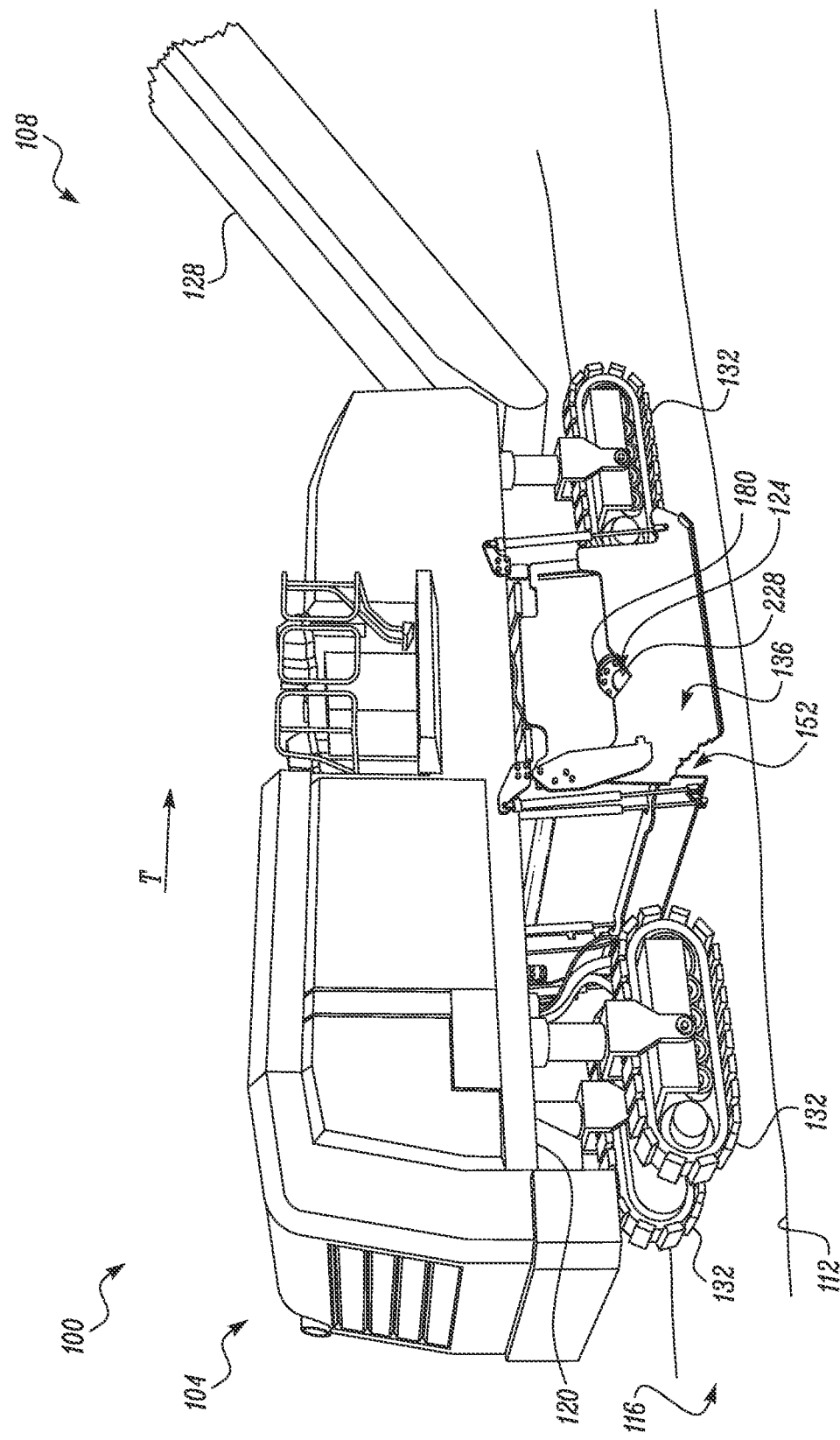
FIG. 1 is a perspective view of an exemplary milling machine that includes a milling assembly, in accordance with one or more aspects of the present disclosure.

Referring to FIG. 1, a machine 100 is shown. The machine 100 may include a milling machine 104, such as a roadway/pavement profiler, a roadway planer, and/or the like. As an example, the milling machine 104 includes a cold planer 108. The machine 100 may be used to perform a milling operation to modify a ground surface 112. For example, the milling operation may mean or include one or more of scarifying, removing, mixing, and/or reclaiming material, from the ground surface 112. The ground surface 112 may be a worn out surface of a roadway 116, formed from one or more of asphalt, bitumen, concrete, and/or other road surface materials. One or more layers of the ground surface 112 may be milled and removed by way of the aforesaid milling operation for the laying of a new ground surface.

The machine 100 may include a frame 120, a milling assembly 124, a conveyor 128, and a set of traction devices 132 to support and propel the machine 100 over an expanse of the roadway 116. The traction devices 132 may include tracks, wheels, or a combination thereof. Exemplarily, the machine 100 may include four traction devices (one at each corner of the frame 120 of the machine 100), although lesser or higher number of traction devices may be contemplated. The traction devices 132 may be adjustably supported on the frame 120 and may be moved or varied independently with respect to the frame 120, such that a distance (e.g., a height) of the frame 120 may be varied relative to the traction devices 132, allowing the frame 120 to acquire a desired orientation with respect to the ground surface 112.

Figure 2:
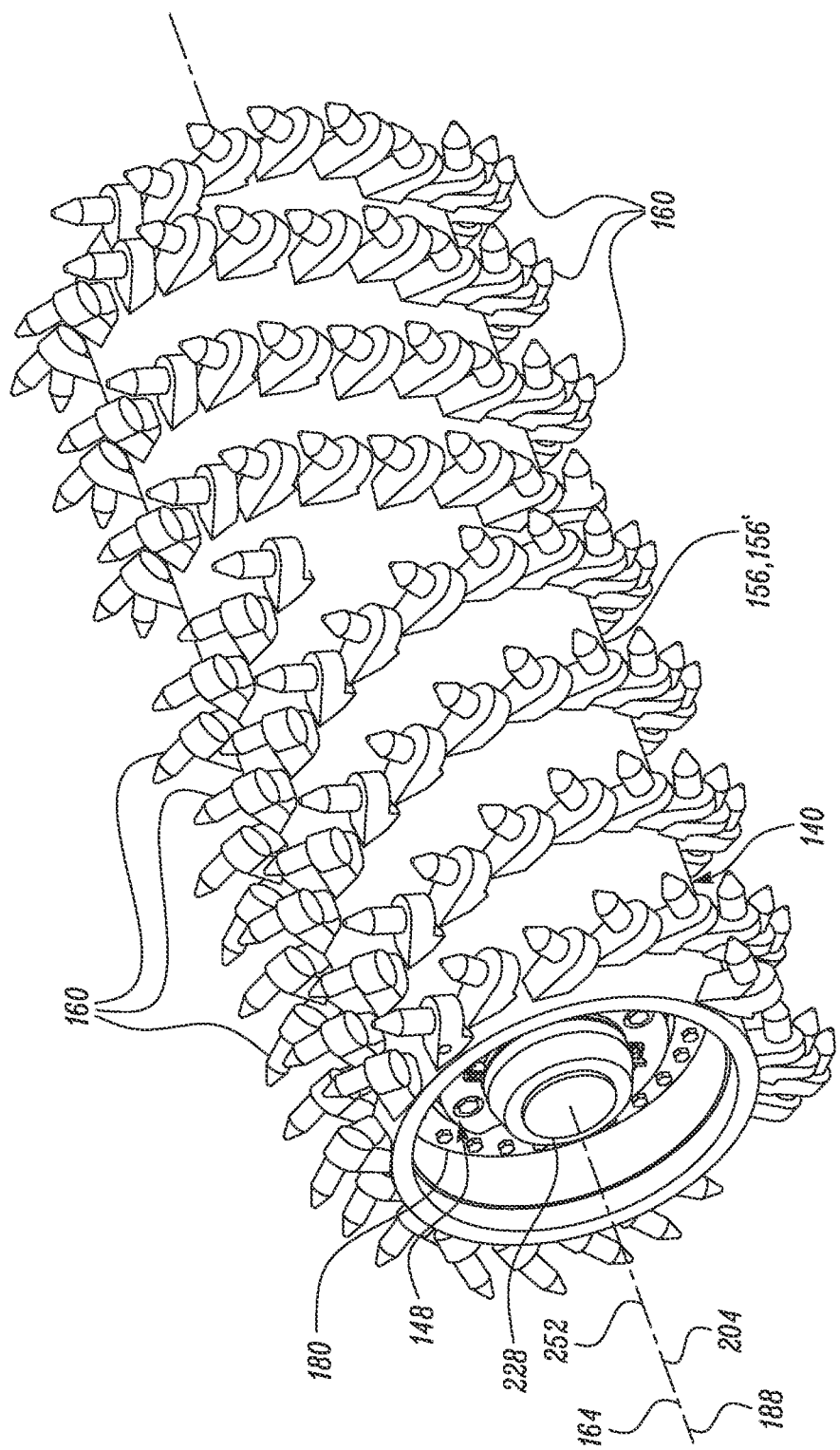
FIG. 2 is a view of an assembled state of certain parts, such as a driveshaft and a milling drum, of the milling assembly, in accordance with one or more aspects of the present disclosure.
Figure 3:
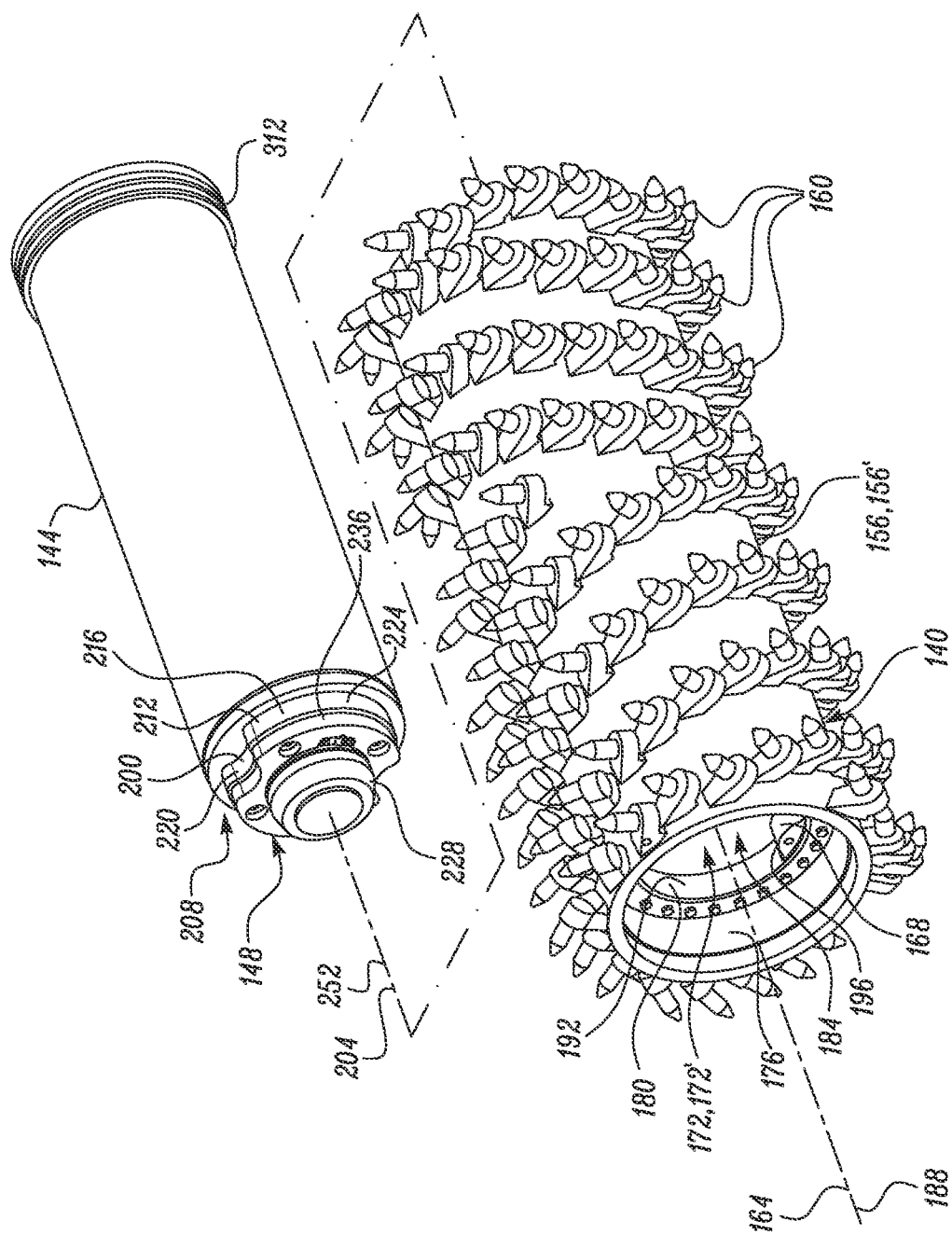
FIG. 3 is a view of an exploded state of certain parts, such as the driveshaft and the milling drum, of the milling assembly, in accordance with one or more aspects of the present disclosure.

Referring to FIGS. 1, 2 and 3, the milling assembly 124 may be supported by the frame 120 and may be configured to facilitate the milling operation. The milling assembly 124 may include a milling chamber 136, a milling drum 140 (see FIGS. 2 and 3), a driveshaft 144 (see FIG. 3), and a retention system 148. During a milling operation, the ground surface 112 may be milled by the milling assembly 124 as the machine 100 moves over the ground surface 112 (e.g., see exemplary direction, T). The milling operation facilitates disintegration of one or more layers of the ground surface 112 to result in milled materials and thus a milled roadway surface. Said milled materials resulting from the milling operation may be transferred to the conveyor 128 so as to clear the milled roadway surface of the milled materials. The conveyor 128 may in turn convey the milled materials into a dump body of a transport vehicle (e.g., a dump truck) (not shown) that may move ahead of the machine 100 during the milling operation.

The milling chamber 136 may be supported on and/or be suspended under the frame 120 of the machine 100 enabling the milling assembly 124, generally as a whole, to acquire a position under the frame 120, as shown. The milling chamber 136 may define an enclosure 152 and may function to confine and restrict a spread of disintegrated particles and the milled materials produced during the milling operation within the enclosure 152 (or within a boundary) defined by the enclosure 152.

The milling drum 140 may be housed within the enclosure 152. The milling drum 140 may be applied to engage and mill the ground surface 112 during the milling operations so as to obtain the milled materials and thus the milled roadway surface. The milling drum 140 may include a drum portion 156 (e.g., a cylindrical drum portion 156') and multiple cutter tools 160 arranged over and around the drum portion 156 (see FIGS. 2 and 3). During a milling operation, the milling drum 140 may be powered (e.g., mechanically or hydraulically) to rotate (e.g., about a drum axis 164). While rotating, the milling drum 140 may be lowered to contact the ground surface 112. In so doing, the milling drum 140 may grind and scrape off a top of the ground surface 112 or one or more layers (e.g., top layers) of the ground surface 112 that the milling drum 140 may come in contact with. In so doing, said layers of the ground surface 112 may break into rubble, dust, and debris, and may result in the formation of the milled materials which may be transferred to the conveyor 128, helping also in turn attain the milled roadway surface.

The milling drum 140 may define a mating surface 168. Exemplary details of the mating surface 168 will now be discussed—the milling drum 140 may include a hollow space 172 (e.g., a cylindrical hollow space 172') defining an inner surface 176 within the drum portion 156. The inner surface 176 may be defined around the drum axis 164, and, although not limited, the inner surface 176 may be cylindrical in profile. Further, the milling assembly 124 may include a rim 180 that may be fixedly positioned with respect to the milling drum 140 within the hollow space 172. In some embodiments, the rim 180 may be abutted and fastened against the inner surface 176 by way of being bolted against a portion (e.g., a flange) (not shown) structured and arranged on the inner surface 176 of the milling drum 140. In some embodiments, the rim 180 may be integrally formed with the drum portion 156 and be in a fixed and/or a merged relationship with the inner surface 176. The rim 180 may define an opening 184, a rim axis 188, and an inner circumferential surface 192 that extends around each of the opening 184 and the rim axis 188, as shown.

A protuberance 196 (see FIGS. 3 and 7) may be arranged on the rim 180. The protuberance 196 may extend from the inner circumferential surface 192 into the opening 184. A surface of the protuberance 196 extending inwardly into the opening 184 of the rim 180 may define the mating surface 168 of the milling drum 140. Additional such protuberances may be arranged on the rim 180, and, together, they may be arrayed around the rim axis 188.

The driveshaft 144 may be powered by a drive source (e.g., a mechanical drive source or a hydraulic drive source) (not shown) so as to be driven (e.g., rotatably driven) to in turn drive the milling drum 140. Although not limited, the driveshaft 144 may include a cylindrical structure, and may be at least partly received into the hollow space 172 defined by the milling drum 140 to allow the milling drum 140 to be mounted onto the driveshaft 144. The driveshaft 144 may be engageable with the milling drum 140 such that a drive (e.g., a rotary drive) of the driveshaft 144 may result in a drive (e.g., a rotary drive) of the milling drum 140. In this regard, the driveshaft 144 may define an engagement surface 200 to engage with the mating surface 168—said engagement enables the driveshaft 144 and the milling drum 140 to be driven (e.g., rotatably driven) in unison. As an example, the driveshaft 144 may be powered to drive the milling drum 140 about an axis (e.g., a drive axis 204), and during a drive of the milling drum 140, the drive axis 204, the rim axis 188, and the drum axis 164, may be all co-axially aligned with each other (see FIGS. 2 and 3).

Exemplary details of the engagement surface 200 will now be discussed—the driveshaft 144 may define the drive axis 204 and an axial end 208. The driveshaft 144 may also include an end protrusion 212 defined at the axial end 208. Although not limited, the end protrusion 212 may be in the form of a plate or a disc and may be integral to the remainder of the driveshaft 144. In some embodiments, however, it is possible for the end protrusion 212 to be separable or removable from the remainder of the driveshaft 144, and, in such a case, the end protrusion 212 may be attachable or couplable to the remainder of the driveshaft 144 by use of threaded fasteners, such as bolts, etc.

The end protrusion 212 may define an outer circumferential surface 216. The outer circumferential surface 216 may match (e.g., in shape and size) with the inner circumferential surface 192 of the rim 180 and thus, the end protrusion 212 may be received into/within the opening 184 of the rim 180. A slot 220 may be arranged on the end protrusion 212. The slot 220 may extend from the outer circumferential surface 216 into a body 224 of the end protrusion 212. A surface defined by the slot 220 extending into the body 224 of the end protrusion 212 may define the engagement surface 200 of the driveshaft 144. Additional such slots may be arranged on the end protrusion 212, and, together, they may be arrayed around the drive axis 204. In some embodiments, a support shaft 228 of the milling assembly 124 may extend outwards from a central hub of the end protrusion 212 or from the driveshaft 144. The support shaft 228 may define a groove 232 (see FIGS. 4 and 5) that may be defined around the drive axis 204.

Since in an assembly of the driveshaft 144 with the milling drum 140, the engagement surface 200 of the driveshaft 144 and the mating surface 168 of the milling drum 140 may be in engagement with each other, it may be possible for the engagement surface 200 to include a profile that matches (i.e., in shape and size) with a profile of the mating surface 168. As an example, if the engagement surface 200 includes a U-shaped profile, the mating surface 168 may also include a corresponding U-shape profile so as to compliment and be mated (e.g., received and accommodated into) with the engagement surface 200. In so doing, the driveshaft 144 and the milling drum 140 may be driven (e.g., rotatably driven) in unison about the drive axis 204, as noted above.

Figure 4:
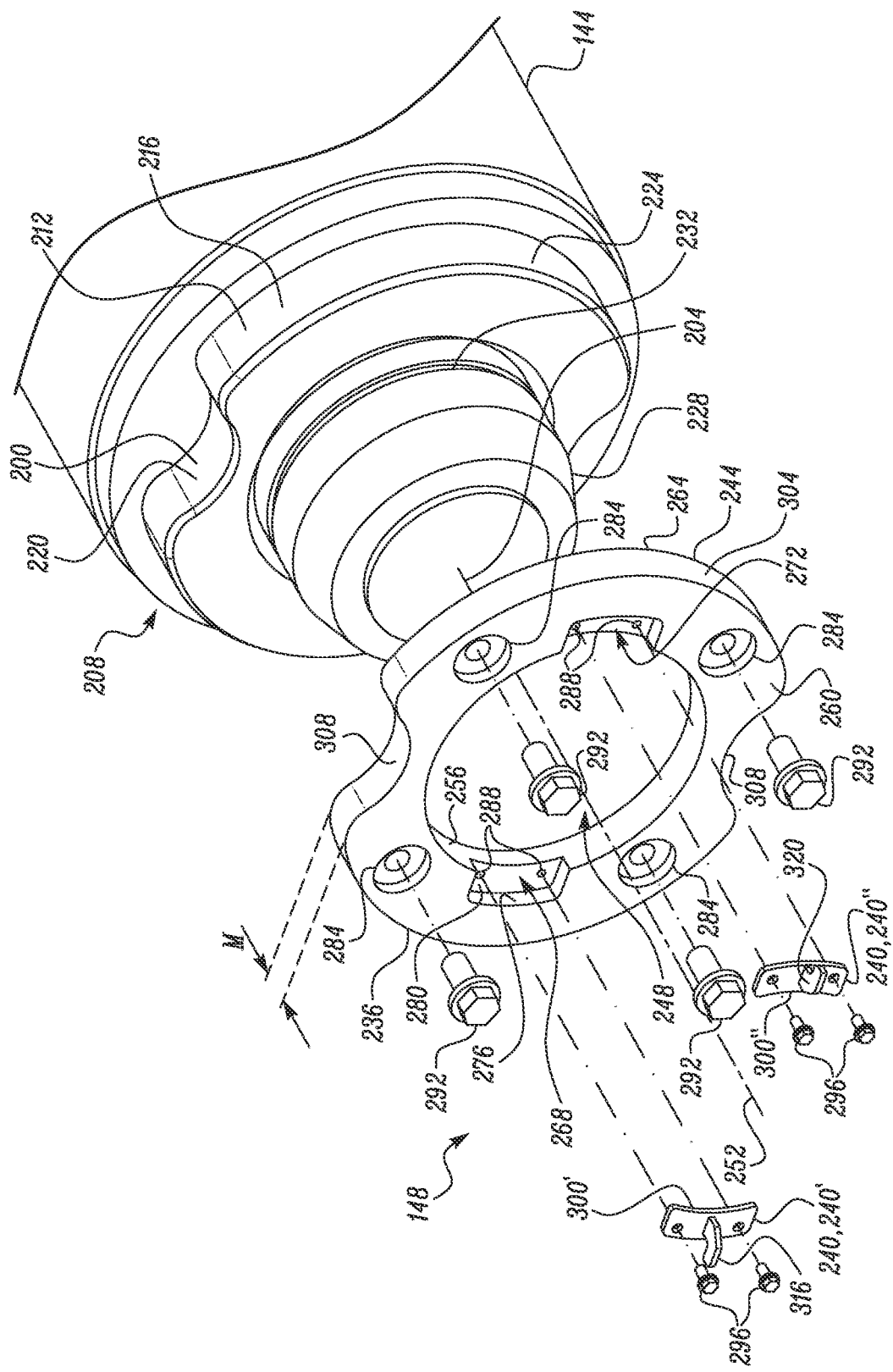
FIG. 4 is a perspective view of a retention system that retains the milling drum to the driveshaft, in accordance with one or more aspects of the present disclosure.
Figure 5:
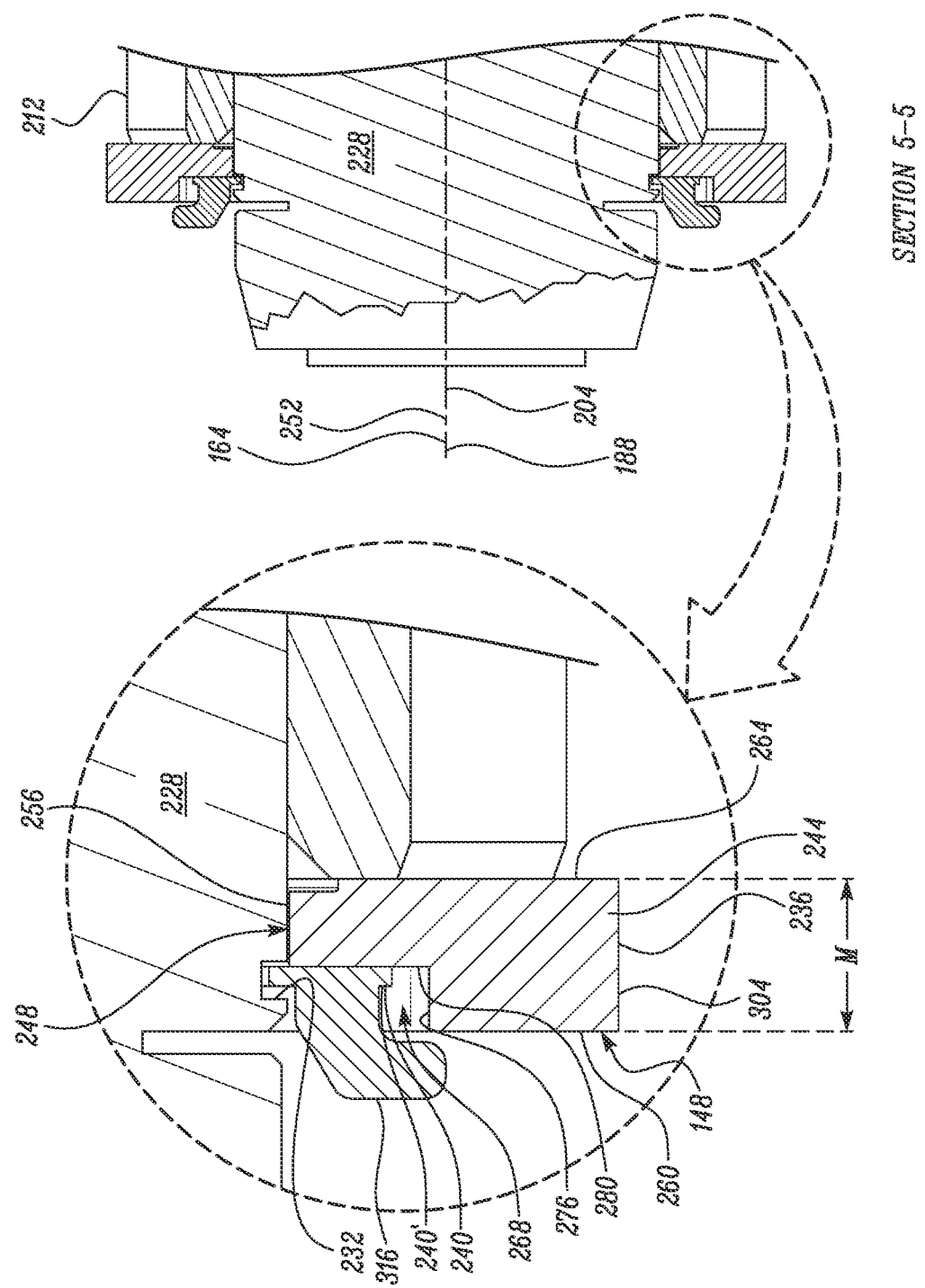
FIG. 5 is a side cross-sectional view of the retention system with a retention member of the retention system being in assembly with an end protrusion or an axial end of the driveshaft, in accordance with an aspect of the present disclosure.

Referring to FIGS. 2, 3, and 4, the engagement between the mating surface 168 and the engagement surface 200, as may be comprehended from the figures and the disclosure above, retains the driveshaft 144 to the milling drum 140 in a rotary direction defined about the drive axis 204. However, said engagement may be unable to retain the milling drum 140 with the driveshaft 144 along the drive axis 204. To attain such retention, in one or more aspects of the present disclosure, the retention system 148 is disclosed. The retention system 148 retains the milling drum 140 to the driveshaft 144 along the drive axis 204. The retention system 148 includes a retention member 236 and one or more plates 240 (e.g., see a first plate 240' and a second plate 240").

The retention member 236 may be couplable to the driveshaft 144 between a first position and a second position. In the first position (e.g., see FIG. 6), the retention member 236 may restrict a disengagement between the engagement surface 200 of the driveshaft 144 and the mating surface 168 of the milling drum 140, inhibiting a release of the milling drum 140 from the driveshaft 144 along the drive axis 204. In the second position (e.g., see FIG. 7), the retention member 236 provides clearance for the disengagement of the engagement surface 200 and the mating surface 168, facilitating the release of the milling drum 140 from the driveshaft 144 along the drive axis 204. Details related to the manner in which the first position and the second position may be attained by the retention member 236 with respect to the driveshaft 144 is discussed later in the present disclosure.

With continued reference to FIG. 4, the retention member 236 may include an annular body 244 defining an aperture 248 and a retention axis 252 passing through the aperture 248. A thickness, M, (see also FIG. 5) of the retention member 236 (or the annular body 244) may be defined to extend along the retention axis 252, as shown. Further, the annular body 244 of the retention member 236 may define an inner peripheral surface 256 extending around the aperture 248 and the retention axis 252, along with axial end surfaces, such as a first end surface 260 and a second end surface 264. The first end surface 260 and the second end surface 264 may be disposed opposite to each other and may be defined in planes that are parallel to each other.

The annular body 244 may also define one or more recesses (e.g., a first recess 268 and a second recess 272). The first recess 268 may be open to each of the inner peripheral surface 256 and the first end surface 260, as shown. As an example, the first recess 268 may extend from the first end surface 260 linearly along the retention axis 252 into the annular body 244, but may stop short about midway to the thickness, M, before reaching up all the way to the second end surface 264. The first recess 268 may define a first wall 276 and a second wall 280. The first wall 276 may be a U-shaped wall oriented to extend along the retention axis 252 and along the thickness, M. The second wall 280 may be a flat wall, and, in some embodiments, may be parallel to each of the first end surface 260 and the second end surface 264. The second recess 272 may define a structure similar to the structure of the first recess 268.

Moreover, the retention member 236 may define two or more through holes, e.g., first through holes 284. The first through holes 284 may extend from the first end surface 260 to the second end surface 264. The retention member 236 may also define second through holes 288. The second through holes 288 may extend from the second wall 280 (of each of the first recess 268 and the second recess 272) to the second end surface 264. The first through holes 284 may correspondingly receive fasteners (e.g., first fasteners 292) therethrough to enable the retention member 236 to be coupled to the driveshaft 144 (or to the end protrusion 212 of the driveshaft 144 defined at the axial end 208 of the driveshaft 144) in (one or either of) the first position and in the second position. As an example, the first fasteners 292 are four in number and are equidistantly spaced and/or rotationally arrayed around the retention axis 252.

The plates 240 may be equal in number to the number of recesses. In that manner, the first plate 240' and the second plate 240" may correspondingly be accommodated and fastened into the first recess 268 and the second recess 272. In this regard, second fasteners 296 may be driven through the first plate 240' and the second plate 240" and then correspondingly through the second through holes 288 so as to fasten the first plate 240' and the second plate 240" correspondingly into the recesses (i.e., the first recess 268 and the second recess 272) and thus to the end protrusion 212 or to the axial end 208 of the driveshaft 144. Both the first plate 240' and the second plate 240" may define corresponding plate sections, namely a first plate section 300' and a second plate section 300". Both the first plate section 300' and the second plate section 300" extend into the aperture 248 once the first plate 240' and the second plate 240" are accommodated and fastened into the first recess 268 and the second recess 272, respectively. Additionally, the plates 240 include grip supports (i.e., a first grip support 316 and a second grip support 320) that allows the plates 240 (i.e., the first plate 240' and the second plate 240") to be held, moved, and manipulated as required, by an operator.

In an assembly of the retention system 148 to the driveshaft 144, the retention member 236 is coupled to the end protrusion 212 or the axial end 208 of the driveshaft 144 by mounting or sliding the annular body 244 of the retention member 236 over the support shaft 228 such that the aperture 248 receives the support shaft 228 therein. Further, in an assembly of the retention system 148 to the driveshaft 144, the plate sections 300', 300" are configured to be slidably received into the groove 232 defined by the support shaft 228. Such receipt of the plate sections 300', 300" restricts a movement of the retention member 236 along the drive axis 204, but allows for a movement (e.g., a rotation) of the retention member 236 around the drive axis 204 so as to be moved between the first position and the second position.

Further, the retention member 236 may define an outer peripheral surface 304 and a cutout surface 308, as shown. The cutout surface 308 may extend from the outer peripheral surface 304 into the annular body 244 of the retention member 236. A profile of the cutout surface 308 may match with a profile of the engagement surface 200 such that, in the second position of the retention member 236, the cutout surface 308 may lie in registration with the engagement surface 200 in order to provide clearance for the disengagement of the engagement surface 200 and the mating surface 168. In so doing, the milling drum 140 may be released from the driveshaft 144. Conversely, it may be noted that in the first position, portions of the retention member 236 which are devoid of the cutout surface 308, may lie in registration with the engagement surface 200. In so doing, a disengagement between the engagement surface 200 and the mating surface 168 is restricted to block/inhibit a release of the milling drum 140 from the driveshaft 144, retaining the milling drum 140 to the driveshaft 144.

A configuration (e.g., shape and size) of the engagement surface 200, mating surface 168, and the cutout surface 308, as described in the present disclosure may be considered to be exemplary. Those of skill in the art may contemplate one or more variations in said configuration without any deviation from the claimed subject matter.

INDUSTRIAL APPLICABILITY

While a milling operation may be in progress during a work cycle, the retention member 236 may be in the first position (see FIG. 6) so as to restrict the disengagement between the engagement surface 200 of the driveshaft 144 and the mating surface 168 of the milling drum 140, inhibiting a release of the milling drum 140 from the driveshaft 144 along the drive axis 204. During the work cycle or before the start of a new work cycle, there may be a need to change the milling drum 140 with a different milling drum—e.g., to bring about a variation in one or more characteristics (e.g., a depth of milling) of the roadway 116. To replace a used or existing milling drum (e.g., milling drum 140) with a different or a new milling drum, the operators and/or site supervisors may first move the machine 100 to a service spot and bring the machine 100 to a halt. Thereafter, the operators/supervisors may open the milling chamber 136 so as to access the enclosure 152 in which the milling drum 140 is positioned.

Once access to the milling drum 140 is established, one or more operators/supervisors may reach out to the retention member 236 of the retention system 148 to unfasten the retention member 236 from the first position—i.e., unfasten and remove the first fasteners 292 from the retention member 236 so as to partially decouple the retention member 236 from the end protrusion 212 or the axial end 208 of the driveshaft 144. The expression 'partially decouple' implies the following—once the first fasteners 292 are removed, the retention member 236 may not be completely withdrawn, pulled, and/or separated away from the driveshaft 144 given the receipt of the plate sections (i.e., the first plate section 300' and the second plate section 300") in the groove 232 defined at the support shaft 228. In other words, because the plate sections (i.e., the first plate section 300' and the second plate section 300") may cooperate with the groove 232, the retention member 236 may still remain facing the axial end 208 of the driveshaft 144 even after the removal of the first fasteners 292 and may be free to rotate with respect to the end protrusion 212 or the axial end 208 of the driveshaft 144, about the drive axis 204.

Figure 6:
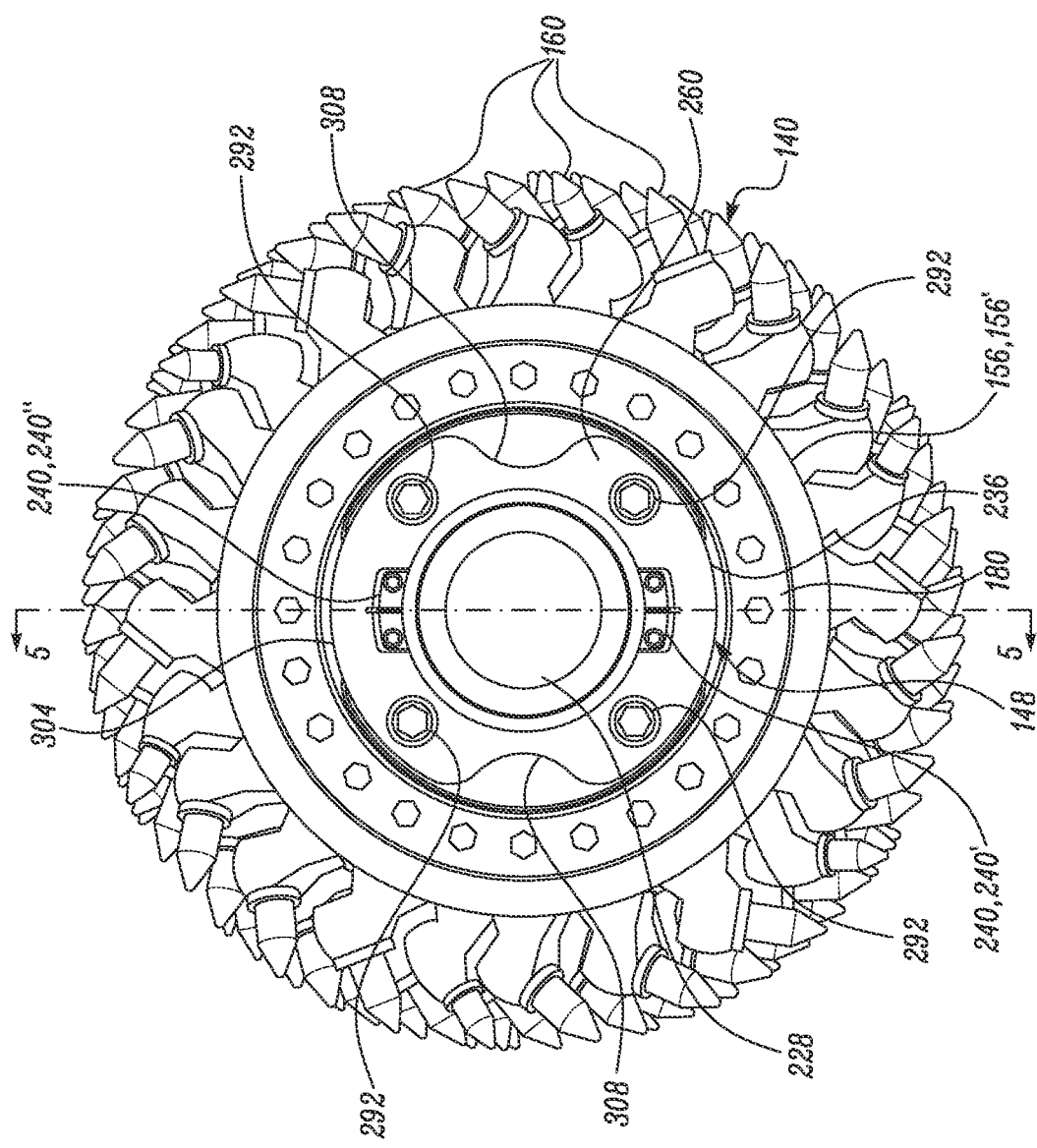
FIG. 6 is a view that illustrates a first position of the retention member with respect to the driveshaft, in accordance with an aspect of the present disclosure.
Figure 7:
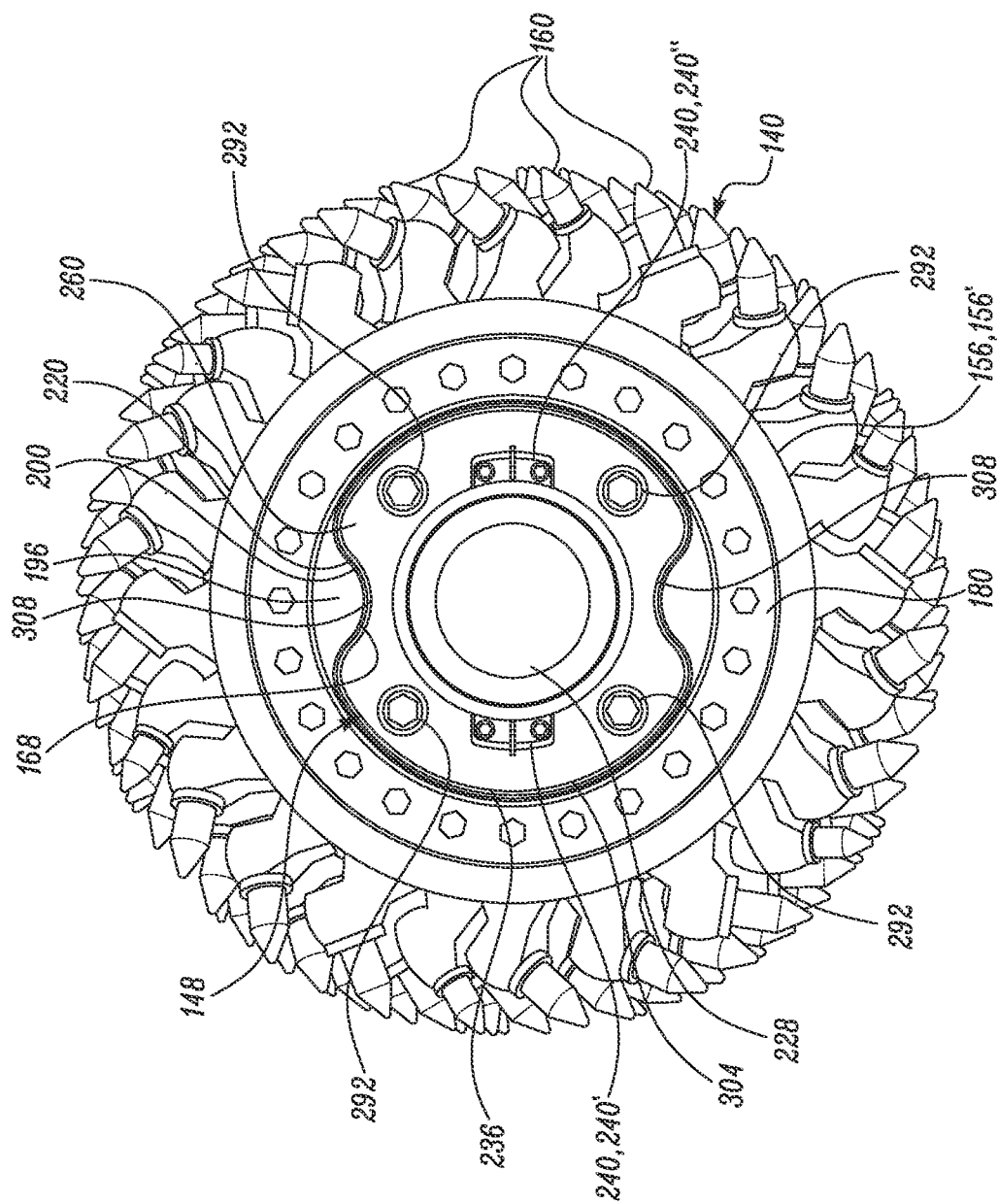
FIG. 7 is a view that illustrates a second position of the retention member with respect to the driveshaft, in accordance with an aspect of the present disclosure.

Accordingly, once the first fasteners 292 may be removed from the driveshaft 144 and the retention member 236, the operators/supervisors may spin or rotate the retention member 236 (e.g., by 90 degrees) about the drive axis 204 or the retention axis 252 to move the retention member 236 to the second position from the first position (see FIGS. 6 and 7 in conjunction). In the second position, the cutout surface 308 may be aligned with the engagement surface 200, and the first fasteners 292 may, optionally, again be used to fasten the retention member 236 onto the end protrusion 212 or the axial end 208 of the driveshaft 144 such that the retention member 236 may be retained in the second position. Given that the profile of the engagement surface 200 may match with the profile of the cutout surface 308 in the second position, the mating surface 168 may be cleared for a disengagement from the engagement surface 200 along the drive axis 204, and, in turn, the milling drum 140 may be released and separated away from the driveshaft 144 along the drive axis 204.

Once the milling drum 140 is removed or released from the driveshaft 144, the retention member 236 may be maintained in the second position such that the clearance that provided for a release of the milling drum 140 from the driveshaft 144 may also be used for the mounting of a new or different milling drum onto the driveshaft 144. To this end, it may be assumed that the new or different milling drum may include the similar features (e.g., the mating surface 168) as of the old milling drum (i.e., milling drum 140). As the new milling drum may be brought in for assembly with the driveshaft 144, the new milling drum may be mounted atop the driveshaft 144 and pushed along the drive axis 204 of the driveshaft 144 such that a hollow space defined within the new milling drum may receive the driveshaft 144 therein. In process, the mating surface of the new milling drum may also engage and be inserted through the cutout surface 308 of the retention member 236 (which is at this point may be in the second position), and said mating surface may then be further moved to be received and accommodated within the engagement surface 200 of the end protrusion 212 or the axial end 208 of the driveshaft 144. At this point, an end of the new milling drum may abut an end collar 312 (see FIG. 3) of the driveshaft 144 so as to restrict any further axial movement (i.e., a movement along the drive axis 204) of the new milling drum with respect to the driveshaft 144 in the pushing direction.

With the mating surface of the new milling drum received (e.g., fully) into the engagement surface 200, the new milling drum may be restricted to move (e.g., rotate) relative to the driveshaft 144 about the drive axis 204. To also restrict the movement of the new milling drum along the drive axis 204, the first fasteners 292 may be then removed so as to free-up the retention member 236 for rotation about the drive axis 204 or the retention axis 252. The retention member 236 may then be spun or rotated in reverse so as to return to the first position, and the first fasteners 292 may then be re-driven through the retention member 236 to fasten the retention member 236 back in the first position. Similar to the discussions above, in the first position, the retention member 236 restricts a disengagement between the engagement surface 200 of the driveshaft 144 and the mating surface of the new milling drum, inhibiting a release of the new milling drum from the driveshaft 144 along the drive axis 204. In the first position, the retention member 236 or the retention system 148 enables the driveshaft 144 and the new milling drum to be rotated together or in unison such that a different or a new milling operation may be carried out.

In some embodiments, the retention member 236 may be fully removed from the end protrusion 212 or the axial end 208 of the driveshaft 144, if required. In this regard, both the first fasteners 292 and the second fasteners 296 may be removed from the retention member 236. Next, the grip supports (i.e., the first grip support 316 and the second grip support 320) of the first plate 240' and the second plate 240" may be accessed (e.g., by an operator) so as to pull out the first plate 240' and the second plate 240" from the first recess 268 and the second recess 272, correspondingly, and also from the groove 232. With the first fasteners 292 and the second fasteners 296 removed, and the first plate 240' and the second plate 240" pulled out from the first recess 268 and the second recess 272, the retention member 236 may be free to be totally decoupled and separated from the end protrusion 212 and/or the support shaft 228.

To couple and/or return the retention member 236 to the end protrusion 212 or to the axial end 208 of the driveshaft 144, the above process may be contemplated in reverse. For example, the retention member 236 may be first mounted onto the end protrusion 212 such that the support shaft 228 may be received into the aperture 248 of the retention member 236. Thereafter, the first plate 240' and the second plate 240" may be received and accommodated correspondingly into the first recess 268 and the second recess 272, and their plate sections (i.e., the first plate section 300' and the second plate section 300") may be inserted into the groove 232. The second fasteners 296 may then be fastened to retain the first plate 240' and the second plate 240" in the first recess 268 and the second recess 272, respectively. The first fasteners 292 may then be driven through the retention member 236 and the axial end 208 or the end protrusion 212 of the driveshaft 144 to retain the retention member 236 to the driveshaft 144 in either of the first position or the second position.

The retention system 148 offers the operator/supervisors the flexibility to easily, efficiently, and reliably, assemble and disassemble various milling drums (e.g., milling drum 140) multiple times onto the driveshaft 144, as and when needed. More particularly, the modularity offered by the retention member 236 to be switched or moved between the first position and the second position (i.e., one in which a release of the milling drum 140 from the driveshaft 144 is inhibited along the drive axis 204 and another in which the release of the milling drum 140 from the driveshaft 144 along the drive axis 204 is facilitated or enabled along the drive axis 204) also mitigates the chances for misplacement or loss of any component of the retention system 148 and makes the disassembly/assembly process for a milling drum changeout easier, less time consuming, and less tedious, in turn enhancing operational comfort, productivity, and work efficiency.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A retention system for retaining a milling drum to a driveshaft of a milling assembly, the driveshaft configured to be powered to drive the milling drum about an axis, the retention system comprising:
   a retention member coupled to the driveshaft between a first position and a second position, wherein
      in the first position, the retention member restricts a disengagement between an engagement surface of the driveshaft and a mating surface of the milling drum, inhibiting a release of the milling drum from the driveshaft along the axis, and
      in the second position, the retention member provides clearance for the disengagement of the engagement surface and the mating surface, facilitating the release of the milling drum from the driveshaft along the axis.

2. The retention system of claim 1, wherein the retention member defines a thickness and two or more through holes to correspondingly receive two or more fasteners therethrough to couple the retention member to the driveshaft in the first position and in the second position.

3. The retention system of claim 1, wherein the retention member includes an annular body defining an aperture, an inner peripheral surface extending around the aperture, an end surface, and one or more recesses open to each of the inner peripheral surface and the end surface.

4. The retention system of claim 3 further including one or more plates correspondingly accommodated and fastened into the one or more recesses, each plate of the one or more plates defining a plate section extending into the aperture.

5. The retention system of claim 4, wherein the plate section is configured to be slidably received into a groove defined by a support shaft extending outwards from the driveshaft facilitating a movement of the retention member between the first position and the second position.

6. The retention system of claim 1, wherein the retention member defines an outer peripheral surface, a cutout surface extending from the outer peripheral surface into a body of the retention member.

7. The retention system of claim 6, wherein a profile of the cutout surface matches with a profile of the engagement surface such that, in the second position of the retention member, the cutout surface lies in registration with the engagement surface to provide clearance for the disengagement of the engagement surface and the mating surface.

8. A milling assembly for a milling machine, the milling assembly comprising:
   a milling drum defining a mating surface;
   a driveshaft configured to be powered to drive the milling drum about an axis, the driveshaft defining an engagement surface to engage with the mating surface;
   a retention system for retaining the milling drum to the driveshaft, the retention system including:
      a retention member couplable to the driveshaft between a first position and a second position, wherein
         in the first position, the retention member restricts a disengagement between the engagement surface and the mating surface, inhibiting a release of the milling drum from the driveshaft along the axis, and in the second position, the retention member provides clearance for the disengagement of the engagement surface and the mating surface, facilitating the release of the milling drum from the driveshaft along the axis.

9. The milling assembly of claim 8, wherein the retention member defines a thickness and two or more through holes to correspondingly receive two or more fasteners therethrough to couple the retention member to the driveshaft in the first position and in the second position.

10. The milling assembly of claim 8, wherein the retention member includes an annular body defining an aperture, an inner peripheral surface extending around the aperture, an end surface, and one or more recesses open to each of the inner peripheral surface and the end surface.

11. The milling assembly of claim 10 further including one or more plates correspondingly accommodated and fastened into the one or more recesses, each plate of the one or more plates defining a plate section extending into the aperture.

12. The milling assembly of claim 11 further comprising a support shaft extending outwards from the driveshaft, the support shaft defining a groove, the plate section is slidably received into the groove facilitating a movement of the retention member between the first position and the second position.

13. The milling assembly of claim 8, wherein the retention member defines an outer peripheral surface, a cutout surface extending from the outer peripheral surface into a body of the retention member.

14. The milling assembly of claim 13, wherein a profile of the cutout surface matches with a profile of the engagement surface such that, in the second position of the retention member, the cutout surface lies in registration with the engagement surface to provide clearance for the disengagement of the engagement surface and the mating surface.

15. A milling machine, comprising:
 a frame;
 a milling assembly supported by the frame, the milling assembly including:
  a milling drum defining a mating surface;
  a driveshaft configured to be powered to drive the milling drum about an axis, the driveshaft defining an engagement surface to engage with the mating surface;
  a retention system for retaining the milling drum to the driveshaft, the retention system including:
   a retention member couplable to the driveshaft between a first position and a second position, wherein
    in the first position, the retention member restricts a disengagement between the engagement surface and the mating surface, inhibiting a release of the milling drum from the driveshaft along the axis, and
    in the second position, the retention member provides clearance for the disengagement of the engagement surface and the mating surface, facilitating the release of the milling drum from the driveshaft along the axis.

16. The milling machine of claim 15, wherein the retention member defines a thickness and two or more through holes to correspondingly receive two or more fasteners therethrough to couple the retention member to the driveshaft in the first position and in the second position.

17. The milling machine of claim 15, wherein the retention member includes an annular body defining an aperture, an inner peripheral surface extending around the aperture, an end surface, and one or more recesses open to each of the inner peripheral surface and the end surface.

18. The milling machine of claim 17 further including one or more plates correspondingly accommodated and fastened into the one or more recesses, each plate of the one or more plates defining a plate section extending into the aperture.

19. The milling machine of claim 18 further comprising a support shaft extending outwards from the driveshaft, the support shaft defining a groove, the plate section is slidably received into the groove facilitating a movement of the retention member between the first position and the second position.

20. The milling machine of claim 15, wherein the retention member defines an outer peripheral surface, a cutout surface extending from the outer peripheral surface into a body of the retention member,
 wherein a profile of the cutout surface matches with a profile of the engagement surface such that, in the second position of the retention member, the cutout surface lies in registration with the engagement surface to provide clearance for the disengagement between the engagement surface and the mating surface.

\* \* \* \* \*